US012650203B2

(12) United States Patent
Yang et al.

(10) Patent No.: US 12,650,203 B2
(45) Date of Patent: Jun. 9, 2026

(54) PRESS COVER ANTI-PINCH DEVICE AND APPARATUS HAVING PRESS COVER

(71) Applicant: CONTEMPORARY AMPEREX TECHNOLOGY (HONG KONG) LIMITED, Hong Kong (CN)

(72) Inventors: Guozhong Yang, Ningde City (CN); Xiangli Sun, Ningde City (CN); Xiaoping Wu, Ningde City (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 531 days.

(21) Appl. No.: 18/313,437

(22) Filed: May 8, 2023

(65) Prior Publication Data

US 2023/0272878 A1 Aug. 31, 2023

Related U.S. Application Data

(63) Continuation of application No. PCT/CN2022/101783, filed on Jun. 28, 2022.

(30) Foreign Application Priority Data

Sep. 29, 2021 (CN) .......................... 202122377586.1

(51) Int. Cl.
*F16P 3/12* (2006.01)
*F16P 3/08* (2006.01)
(52) U.S. Cl.
CPC .. *F16P 3/12* (2013.01); *F16P 3/08* (2013.01)
(58) Field of Classification Search
CPC ...................................... F16P 3/12; F16P 3/08
See application file for complete search history.

(56) References Cited

U.S. PATENT DOCUMENTS

| | | | |
|---|---|---|---|
| 2019/0112839 A1* | 4/2019 | Grimm | F16P 3/08 |
| 2022/0010603 A1* | 1/2022 | Karrasch | E05B 15/021 |
| 2026/0001339 A1* | 1/2026 | Oya | B41J 2/17523 |

FOREIGN PATENT DOCUMENTS

| | | |
|---|---|---|
| CN | 203601830 U | 5/2014 |
| CN | 205402530 U | 7/2016 |

(Continued)

OTHER PUBLICATIONS

ISR for International Application No. PCT/TR2020/051103 mailed Jul. 14, 2021.

(Continued)

*Primary Examiner* — Eret C Mcnichols
(74) *Attorney, Agent, or Firm* — Ladas & Parry LLP

(57) ABSTRACT

A press cover anti-pinch device and an apparatus having a press cover is disclosed. The press cover anti-pinch device comprises: a connector arranged at a lower side of a cover body of the press cover and fixed to the press cover; and a support hinged to the connector and rotatably arranged in a supporting position or in a collapsed position, wherein when the support is arranged in the supporting position, the support swings down and supports the press cover on a supporting surface, and when the support is arranged in the collapsed position, the support is collapsed and the press cover is lowered. During use, when the press cover is in an opened state, the support swings down and supports the press cover on the supporting surface, so that the support provides a supporting force to the press cover.

19 Claims, 6 Drawing Sheets

(56)        References Cited

FOREIGN PATENT DOCUMENTS

| CN | 107310689 | A | | 11/2017 | | |
|----|-----------|---|---|---------|---|---|
| CN | 208429198 | U | | 1/2019 | | |
| CN | 112843616 | A | | 5/2021 | | |
| CN | 216003895 | U | | 3/2022 | | |
| DE | 3907334 | A | * | 9/1990 | | |
| DE | 4344412 | A1 | * | 6/1995 | ........... | A43D 119/00 |
| DE | 10234316 | A1 | * | 2/2004 | ............ | B01F 35/605 |
| DE | 102004038488 | A1 | * | 2/2006 | .......... | H01H 27/007 |
| EP | 0507708 | A1 | | 10/1992 | | |
| FR | 3096377 | A1 | | 11/2020 | | |
| JP | H02176021 | A | | 7/1990 | | |
| JP | H08177291 | A | | 7/1996 | | |
| JP | 2919468 | B1 | | 7/1999 | | |

OTHER PUBLICATIONS

Written Opinion for International Application No. PCT/TR2020/051103 mailed Jul. 14, 2021.
Extended European Search Report for Application No. 22874331, mailed Apr. 5, 2024, 7 pages.
Notice of Allowance for European Application No. 22874331.6, mailed Nov. 25, 2024, 43 pages.
ISR for International Application No. PCT/CN2022/101783 mailed Sep. 29, 2022.
Written Opinion for International Application No. PCT/CN2022/101783 mailed Sep. 29, 2022.

* cited by examiner

1

PRESS COVER ANTI-PINCH DEVICE AND APPARATUS HAVING PRESS COVER

CROSS-REFERENCE TO RELATED APPLICATIONS

The present application is a continuation of International application PCT/CN2022/101783 filed on Jun. 28, 2022 which claims the priority of Chinese patent application no. 202122377586.1, entitled "PRESS COVER ANTI-PINCH DEVICE AND APPARATUS HAVING PRESS COVER" and filed on Sep. 29, 2021 The entire content of these applications is incorporated herein by reference.

TECHNICAL FIELD

The present application relates to the field of press cover apparatuses, and in particular to a press cover anti-pinch device and an apparatus having a press cover.

BACKGROUND ART

With the development of science and technology, press cover apparatuses have been widely used in the field of production and processing. During use, a user first opens a press cover to complete a corresponding operation and then closes the press cover. When the press cover is in an opened state, the hand of the user are located within a vertical projection area range of the press cover, and at this time, once the press cover is faulty and then falls down, the hand of the user will be pinched, so there is a potential safety hazard. Therefore, it is very necessary to provide a press cover anti-pinch device.

SUMMARY OF THE INVENTION

In view of this, there is a need to provide a press cover anti-pinch device and an apparatus having a press cover, in order to solve the technical problem in the prior art that a press cover falling down is prone to pinching the hand of a user during use of a press cover apparatus, which may bring a potential safety hazard.

To achieve the above object, in a first aspect, the inventors provide a press cover anti-pinch device, comprising:

a connector arranged at a lower side of a cover body of a press cover and fixed to the press cover; and a support hinged to the connector and rotatably arranged in a supporting position or in a collapsed position, wherein when the support is arranged in the supporting position, the support swings down and supports the press cover on a supporting surface, and when the support is arranged in the collapsed position, the support is collapsed and the press cover is lowered.

In the technical solution of the present application, the connector and the support are provided, so that when the support is arranged in the supporting position, the support swings down and supports the press cover on the supporting surface, and when the support is arranged in the collapsed position, the support is collapsed and the press cover is lowered. During use, when the press cover is in an opened state, the support swings down and supports the press cover on the supporting surface, so that the support provides a supporting force to the press cover, and when the hand of the user perform an operation within a projection area range of the press cover, the press cover cannot fall down even if the press cover is faulty, effectively ensuring the safety of the user during the operation. When the operation is completed, the support is arranged in the collapsed position, and at this time, the support is collapsed and the press cover is lowered for a next operation.

As an embodiment of the present application, the press cover anti-pinch device further comprises: a locking mechanism arrangeable in a locking position or in an unlocking position, wherein when the locking mechanism is arranged in the locking position, the support is locked in the supporting position and/or the collapsed position, and when the locking mechanism is arranged in the unlocking position, the support is rotatable to another position other than the locking position. Providing the locking structure enables the support to be in a locked state when located in the supporting position and/or the collapsed position, avoiding relative sliding and further improving the safety of the operation.

As an embodiment of the present application, the locking mechanism comprises: a reset member configured to automatically reset the locking mechanism from the unlocking position to the locking position when the support is arranged in the supporting position and/or the collapsed position. Providing the reset member enables the locking mechanism to be automatically reset from the unlocking position to the locking position when the support is rotated to the supporting position and/or the collapsed position, so that the operation is more convenient and faster.

As an embodiment of the present application, the reset member is a gravitational reset member or an elastic reset member. The gravitational reset member automatically resets the locking mechanism from the unlocking position to the locking position by means of a downward movement due to its own gravity; and the elastic reset member automatically resets the locking mechanism from the unlocking position to the locking position by means of the action of an elastic potential energy. Configuring the reset member as the gravitational reset member or the elastic reset member can better meet the requirements of different application scenarios.

As an embodiment of the present application, the reset member is hinged to the connector or the support, and swings down by means of its own gravity to automatically reset the locking mechanism to the locking position. When the support is rotatable, the locking mechanism is in the unlocking position, and the reset member is risen up under the pressure of the support; and when the support is rotated to the supporting position and/or the collapsed position, the reset member swings down by means of its own gravity to automatically reset the locking mechanism to the locking position so as to ensure that the locking mechanism locks the support in the supporting position and/or the collapsed position. Providing the reset member hinged to the connector or the support enables switching between the locking position and the unlocking position of the locking mechanism to be more convenient and faster.

As an embodiment of the present application, the press cover anti-pinch device further comprises: an unlocking trigger arranged in a contact position and configured to unlock the locking mechanism from the locking position to the unlocking position when the reset member comes into contact with the unlocking trigger. When it is required to switch the support from the locked state to a rotatable state, it is only necessary to make the reset member come into contact with the unlocking trigger, so that the reset member unlocks the locking mechanism from the locking position to the unlocking position by means of a reset action, and at this time, the support is switched from the locked state to the rotatable state. Providing the unlocking trigger enables switching between the locking position and the unlocking position of the locking mechanism to be more convenient and faster, and thus switching from the locked state to the rotatable state of the support to be more convenient and faster.

As an embodiment of the present application, the contact position is a position where the reset member comes into contact with the unlocking trigger when the press cover is lowered. In this way, when the press cover is lowered, the reset member comes into contact with the unlocking trigger in the contact position, so that the locking mechanism is unlocked from the locking position to the unlocking position under the action of the reset member, and at this time, the support is switched from the locked state to the rotatable state, thereby ensuring that when the press cover is risen, the support can swing down and support the press cover on the supporting surface during the next operation. Setting the contact position as the position where the reset member comes into contact with the unlocking trigger when the press cover is lowered can ensure that the support is automatically switched to the rotatable state when the press cover is lowered, so that the operation is more convenient during next use.

As an embodiment of the present application, the locking mechanism comprises: a first locking structure arranged on or connected to the connector and having a first engagement portion; and a second locking structure arranged on or connected to the support and having a second engagement portion adapted to the first engagement portion, wherein when the support is arranged in the supporting position and/or the collapsed position, the first engagement portion is engaged with the second engagement portion. The engagement between the first locking structure and the second locking structure to lock the support in the supporting position and/or the collapsed position can prevent the support from moving in the supporting position and/or the collapsed position, improving the safety of the operation. When the first engagement portion and the second engagement portion are separated from each other, namely, when the locking mechanism is in the unlocking position, the support is in the rotatable state again, and state switching is convenient and free.

In an embodiment of the present application, the connector or the support has a curved surface portion with a hinged shaft as a central axis at the end where the connector is hinged to the support, and the first engagement portion or the second engagement portion is arranged on the curved surface portion. In this way, when the support is rotated to the supporting position and/or the collapsed position, the first engagement portion and the second engagement portion are automatically engaged closely, so that locking of the support is more convenient and faster.

As an embodiment of the present application, the locking mechanism further comprises: a reset member hinged to the connector or the support and configured to automatically reset the locking mechanism from the unlocking position to the locking position when the support is arranged in the supporting position and/or the collapsed position, the reset member having the first locking structure or the second locking structure. The first locking structure or the second locking structure is arranged on the reset member, such that when the support is in the supporting position and/or the collapsed position, the support is locked by means of the engagement between the locking structure on the reset member and the locking structure on the support; and when the locking structure on the reset member is separated from the locking structure on the support, the support is in the rotatable state again, so that the two states of the support are free to switch, and the operation is more convenient and faster.

As an embodiment of the present application, one end of the reset member is hinged to the connector, the other end thereof is a movable end, the first locking structure is arranged on the reset member, and the first engagement portion is arranged between the hinged end and the movable end of the connector; and the unlocking position of the unlocking trigger is arranged in a path along which the movable end of the reset member is lowered with the press cover. Since the unlocking position of the unlocking trigger is arranged in the path along which the movable end of the reset member is lowered with the press cover, when the press cover is lowered, the movable end is driven to lower therewith, and when the movable end is lowered to the unlocking position of the unlocking trigger, the unlocking trigger applies an upward reaction force to the movable end of the reset member, so that the first engagement portion and the second engagement portion are separated from each other to ensure that the support is in the rotatable state when being collapsed for next use.

As an embodiment of the present application, the reset member is arranged transversely. The reset member is arranged transversely, so that it can be ensured that the movable end of the reset member can easily come into contact with the unlocking trigger during the lowering of the reset member with the press cover.

As an embodiment of the present application, when the connector is risen with the cover body, the support swings down to the supporting position by means of its own gravity. Since the connector is arranged at the lower side of the cover body of the press cover and the support is in turn hinged to the connector, during rising, the cover body of the press cover drives the connector to rise, and due to the action of gravity, the support swings down to the supporting position, so as to support the cover body of the press cover. With such an arrangement, it can be ensured that when the cover body is risen to a certain height, the support automatically swings down to the supporting position for providing a support function to the cover body, further improving the safety of production operation.

As an embodiment of the present application, a handle structure for an operator to apply a force is arranged on the support. After use, the operator can apply an acting force to the support in a rotation direction by means of the handle structure, so that the support is removed from the supporting position, the press cover is then lowered, and the support is collapsed for next use.

In a second aspect, the inventors further provide an apparatus having a press cover, the press cover being openable or closable, and a press cover anti-pinch device as described in the first aspect being arranged at a lower side of the press cover.

Compared with the prior art, the apparatus having the press cover in the present application comprises the press cover and the press cover anti-pinch device, the support in the press cover anti-pinch device can be in the supporting position after the press cover is risen to support the cover body of the press cover, preventing the cover body from suddenly falling down to hurt an operator due to a fault, and effectively ensuring the safety of the operator during operation.

As an embodiment of the present application, the apparatus is a tank-type apparatus. The tank-type apparatus is often used in daily production and processing. Arranging the press cover anti-pinch device in the tank-type apparatus can cover more operation scenarios as much as possible to ensure the safety of an operator during operation.

The aforementioned description is only an overview of the technical solutions of the present application. In order to more clearly understand the technical means of the present application to implement same according to the contents of the specification, and in order to make the aforementioned and other objects, features and advantages of the present application more obvious and understandable, specific embodiments of the present application are exemplarily described below.

BRIEF DESCRIPTION OF THE DRAWINGS

Various other advantages and benefits will become apparent to those of ordinary skill in the art upon reading the following detailed description of preferred embodiments. The drawings are merely for the purpose of illustrating the preferred embodiments and are not to be construed as limiting the present application. Moreover, like components are denoted by like reference numerals throughout the drawings. In the drawings.

Figure 1:
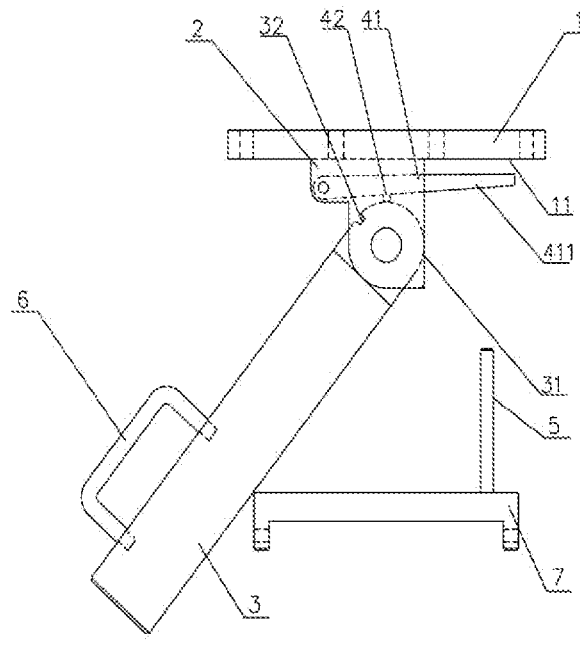
FIG. 1 is a schematic structural diagram of a press cover anti-pinch device of a press cover during rising according to an embodiment of the present application.

6 member comes into contact with the unlocking trigger, according to a further embodiment of the present application.

LIST OF REFERENCE SIGNS

1. Cover body;
11. Supporting surface;
2. Connector;
3. Support;
31. Curved surface portion;
32. Second locking structure;
4. Locking mechanism;
41. Reset member; 411. Movable end; 412. Spring;
42. First locking structure;
5. Unlocking trigger;
6. Handle structure;
7. Base.

DETAILED DESCRIPTION OF EMBODIMENTS

In order to explain the technical contents, structural features and achieved objects and effects of the technical solutions in detail, the following detailed description will be given in conjunction with the specific embodiments and the accompanying drawings.

Embodiments of the technical solutions of the present application will be described in more detail below with reference to the drawings. The following embodiments are merely intended to more clearly illustrate the technical solutions of the present application, so they merely serve as examples, but are not intended to limit the scope of protection of the present application.

Unless otherwise defined, all technical and scientific terms used herein have the same meanings as those commonly understood by those skilled in the art to which the present application belongs. The terms used herein are merely for the purpose of describing specific embodiments, but are not intended to limit the present application. The terms "comprising" and "having" and any variations thereof in the description and the claims of the present application as well as the brief description of the accompanying drawings described above are intended to cover non-exclusive inclusion.

In the description of the embodiments of the present application, the technical terms "first", "second", etc. are merely used for distinguishing different objects, and are not to be construed as indicating or implying relative importance or implicitly indicating the number, particular order or primary-secondary relationship of the technical features modified thereby. In the description of the embodiments of the present application, the phrase "a plurality of" means two or more, unless otherwise explicitly and specifically defined.

The phrase "embodiment" mentioned herein means that the specific features, structures, or characteristics described in conjunction with the embodiment can be encompassed in at least one embodiment of the present application. The phrase at various locations in the description does not necessarily refer to the same embodiment, or an independent or alternative embodiment exclusive of another embodiment. Those skilled in the art understand explicitly or implicitly that the embodiment described herein may be combined with another embodiment.

In the description of the embodiments of the present application, the term "and/or" is merely intended to describe the associated relationship of associated objects, indicating that three relationships can exist, for example, A and/or B can include: the three instances of A alone, A and B simultaneously, and B alone. In addition, the character "/" herein generally indicates an "or" relationship between the associated objects.

In the description of the embodiments of the present application, the term "a plurality of" means two or more (including two), similarly the term "a plurality of groups" means two or more groups (including two groups), and the term "a plurality of pieces" means two or more pieces (including two pieces).

In the description of the embodiments of the present application, the orientation or position relationship indicated by the technical terms "central", "longitudinal", "transverse", "length", "width", "thickness", "upper", "lower", "front", "rear", "left", "right", "vertical", "horizontal", "top", "bottom", "inner", "outer", "clockwise", "counterclockwise" "axial", "radial", "circumferential", etc. are based on the orientation or position relationship shown in the drawings and are merely intended to facilitate and simplify the description of the embodiments of the present application, rather than indicating or implying that the device or element considered must have a particular orientation or be constructed and operated in a particular orientation, and therefore not to be construed as limiting the embodiments of the present application.

In the description of the embodiments of the present application, unless otherwise explicitly specified and defined, the technical terms "mounting", "mutual connection", "connection", "fixing", etc. should be understood in a broad sense, for example, they may be a fixed connection, a detachable connection, or an integrated connection; may be a mechanical connection or an electrical connection; and may be a direct connection or an indirect connection through an intermediate medium, and may be communication between interiors of two elements or interaction between the two elements. For those of ordinary skill in the art, the specific meaning of the above terms in the embodiments of the present application can be understood according to specific situations.

At present, a press cover apparatus has been widely used in the field of production and processing. The press cover apparatuses has a cover body, which needs to be opened during operation and is closed after an operator finishes the operation. In addition to a manual manner, the cover body of the press cover apparatus may also be opened or closed in an electric-motor-driven, hydraulically-driven, or cylinder-driven manner, etc. However, no matter what manner is used, the cover body is risen to a certain height in an opened state, and the operator needs to extend the hand into a vertical projection area range of the cover body during operation. If the cover body falls down suddenly due to a fault at this time, the hand of the operator will be pinched and hurt, so there is a potential safety hazard.

In order to improve the safety of the operation, when the cover body of the press cover is in the opened state, the operator often uses one or more support rods to support the cover body, one end of the support rod abutting against a lower surface of the cover body, and the other end thereof abutting against a contact surface. However, the inventors have noted that the support rod will be relatively moved on the contact surface if it is subjected to an external force, and once the support rod is moved, the support rod is very prone to being removed from a supporting state due to the action of gravity of the cover body, and if the operator is operating at this time, the cover body suddenly falling down will directly pinch and hurt the hand of the operator, so there is still a great potential safety hazard in the manner of using only the support rod to support the opened cover body.

For example, safe production is pursued during manufacturing of lithium batteries, and proportioned powder feeding is the first process of lithium battery manufacturing. Due to the constraints of production techniques and equipment technology, at present, main powder materials are mostly fed in a semi-automatic manner in a factory. When the operator operates a semi-automatic feeding system, it is required to extend under a press cover of a feeder so as to sleeve a discharge port of a jumbo bag into a liner of a delivery port. However, since the press cover is heavy and is usually driven by a cylinder or an electric motor, so there is a risk that the hand of the operator are pinched in the feeding process of the operation.

In order to solve the problem that the cover body of the press cover suddenly falling down is prone to pinching and hurting the hand of the operator, the inventors, after intensive research, designed a press cover anti-pinch device, so that a support 3 can have a better stability when supporting the press cover, preventing the cover body suddenly falling down from directly pinching the hand of the operator.

With reference to FIGS. 1 to 12, the present application provides a press cover anti-pinch device. The press cover anti-pinch device includes a connector 2 and a support 3. The connector 2 is arranged at a lower side of a cover body 1 of a press cover and is fixed to the press cover. The support 3 is hinged to the connector 2 and is rotatably arranged in a supporting position or in a collapsed position. When the support 3 is arranged in the supporting position, the support 3 swings down and supports the press cover on a supporting surface 11, and when the support 3 is arranged in the collapsed position, the support 3 is collapsed and the press cover is lowered.

The supporting position refers to a position where the support 3 is located when the support 3 plays a supporting role, and is preferably a vertical position perpendicular to the lower surface of the cover body 1 of the press cover, but may also be a position at other angles to the lower surface of the cover body 1 of the press cover. In short, when the support 3 is in a position where the support 3 can support the cover body 1 of the press cover, the position can be referred to as the supporting position.

The collapsed position is named relative to the supporting position, and when the support 3 is in the supporting position, the support 3 applies a supporting force to the lower surface of the cover body 1 of the press cover, so that the cover body 1 of the press cover cannot fall down. Thus, when it is required to lower the press cover, it is necessary to remove the support 3 from the supporting position, and the support 3 is rotated, after being removed from the supporting position, to a position allowing the cover body 1 of the press cover to be lowered, which is referred to as the collapsed position. The collapsed position is preferably set horizontally relative to the lower surface of the press cover, but may also be a position at other angles to the lower surface of the cover body 1 of the press cover. In short, when the support 3 is rotated, after being removed from the supporting position, to a position where the support 3 no longer supports the cover body 1 of the press cover, and the cover body 1 of the press cover can be lowered, the position can be referred to as the collapsed position.

Compared with the prior art, the press cover anti-pinch device provided by the present application includes the connector 2 and the support 3, wherein when the support 3 is arranged in the supporting position, the support 3 swings down and supports the press cover on the supporting surface 11, and when the support 3 is arranged in the collapsed position, the support 3 is collapsed and the press cover is lowered. During use, when the press cover is in the opened state, the support 3 swings down and supports the press cover on the supporting surface 11, so that the support 3 provides a supporting force to the press cover, and when the hand of a user perform an operation within a projection area range of the press cover, the press cover cannot fall down even if the press cover is faulty, effectively ensuring the safety of a user during the operation. When the operation is completed, the support 3 is arranged in the collapsed position, and at this time, the support 3 is collapsed and the press cover is lowered for a next operation. Since the support 3 is hinged to the connector 2 and the connector 2 is in turn fixed to the lower side of the cover body 1 of the press cover, the support 3 cannot relatively move when the support 3 is in the supporting position, improving the safety of the operation.

According to some embodiments of the present application, optionally, the press cover anti-pinch device further includes a locking mechanism 4. The locking mechanism 4 is arrangeable in a locking position or in an unlocking position, wherein when the locking mechanism 4 is arranged in the locking position, the support 3 is locked in the supporting position and/or the collapsed position, and when the locking mechanism 4 is arranged in the unlocking position, the support 3 is rotatable to another position other than the locking position. Providing the locking mechanism 4 enables the support 3 to be in a locked state when located in the supporting position and/or the collapsed position, avoiding relative sliding and further improving the safety of the operation.

The locking position, as the name implies, refers to a position in the locked state, and when the locking mechanism 4 is in the locking position, the support 3 is locked in the supporting position and/or the collapsed position, so as to avoid the relative movement of the support 3 in the supporting position and/or the collapsed position, further improving the stability of the support 3.

The unlocking position, as the name implies, refers to a position in an unlocked state, and when the locking mechanism 4 is in the unlocking position, the support 3 is in a rotatable state and can be rotated to another position other than the locking position.

When the support 3 is in the supporting position, the locking mechanism 4 is in the unlocking position; and when the support 3 is in the collapsed position, the locking mechanism 4 is in the locking position. After the operation is finished, the operator can rotate the support 3 from the supporting position to the collapsed position so as to lower the press cover.

In some other embodiments, the relationship between the support 3 and the locking mechanism 4 may also be set such that when the support 3 is in the supporting position, the locking mechanism 4 is in the locking position; and when the support 3 is in the collapsed position, the locking mechanism 4 is in the unlocking position. In the embodiment, since the support 3 is locked by the locking mechanism 4 when located in the supporting position, the relative sliding of the support 3 can be avoided, effectively improving the stability of the support 3 in the supporting position. After the operation is finished, the operator can first switch the locking mechanism 4 from the locking position to the unlocking position by adjusting the locking mechanism so that the support 3 is in the rotatable state, and the operator then rotates the support 3 from the supporting position to the collapsed position so as to lower the press cover to complete the operation.

In some other embodiments, the relationship between the support 3 and the locking mechanism 4 may also be set such that when the support 3 is in the supporting position, the locking mechanism 4 is in the locking position; and when the support 3 is in the collapsed position, the locking mechanism 4 is in the locking position. In the embodiment, since the support 3 is locked by the locking mechanism in both the supporting position and the collapsed position, the relative sliding of the support 3 in the supporting position and the collapsed position can be avoided, further improving the safety of the operation. When the operator finishes the operation, if the support 3 is in the supporting position at this time, the operator can first switch the locking mechanism from the locking position to the unlocking position by adjusting the locking mechanism so that the support 3 is in the rotatable state, the operator then rotates the support 3 from the supporting position to the collapsed position, and when the support 3 is in the collapsed position, the support 3 is locked again by the locking mechanism, so as to ensure that the support 3 cannot relatively move in the lowering process of the press cover, thus improving the safety of the operation. Preferably, after the press cover is lowered to a predetermined height, namely, after the cover body 1 of the press cover is closed to complete this operation, the locking mechanism is switched from the locking position to the unlocking position again so that the support 3 is in the rotatable state, so as to ensure normal use during the next operation.

In some embodiments, the locking mechanism 4 includes: a reset member 41. The reset member 41 is configured to automatically reset the locking mechanism from the unlocking position to the locking position when the support 3 is arranged in the supporting position and/or the collapsed position. Providing the reset member 41 enables the locking mechanism to be automatically reset from the unlocking position to the locking position when the support 3 is rotated to the supporting position and/or the collapsed position, so that the operation is more convenient and faster.

Preferably, the reset member 41 is a gravitational reset member or an elastic reset member. The gravitational reset member automatically resets the locking mechanism from the unlocking position to the locking position by means of a downward movement due to its own gravity; and the elastic reset member automatically resets the locking mechanism from the unlocking position to the locking position by means of the action of an elastic potential energy. Configuring the reset member as the gravitational reset member or the elastic reset member can better meet the requirements of different application scenarios. For example, the reset member 41 in FIGS. 1-4 is the gravitational reset member, the reset member 41 in FIGS. 9-12 is the elastic reset member, and the reset member 41 in FIGS. 5-8 is a combination of the gravitational reset member and the elastic reset member. The specific operating principles of the three forms will be described in detail below.

In some embodiments, the reset member 41 is hinged to the connector 2 or the support 3, and swings down by means of its own gravity to automatically reset the locking mechanism to the locking position. When the support 3 is rotatable, the locking mechanism is in the unlocking position, and the reset member 41 is risen up under the pressure of the support 3; and when the support 3 is rotated to the supporting position and/or the collapsed position, the reset member 41 swings down by means of its own gravity to automatically reset the locking mechanism to the locking position so as to ensure that the locking mechanism locks the support 3 in the supporting position and/or the collapsed position. Providing the reset member 41 hinged to the connector 2 or the support 3 enables switching between the locking position and the unlocking position of the locking mechanism to be more convenient and faster.

As shown in FIGS. 1-8, the reset member 41 may be a cross rod structure, and as shown in FIGS. 9-12, the reset member 41 may also be a cross rod structure. In some other embodiments, the reset member 41 may also be an L-shaped structure. The L-shaped structure includes a cross rod and a vertical rod, wherein a first locking structure 42 is arranged on the cross rod to fit with a second locking structure 32 on the support 3, thereby switching the locking mechanism between the locking position and the unlocking position, and a spring 412 connected to the support 3 is arranged on the vertical rod to automatically reset the locking mechanism to the locking position. Of course, the reset member 41 may also be of structures in other shapes, in short, any structure of the reset member 41 enabling the locking mechanism to be automatically reset to the locking position falls within the scope of protection of the embodiment.

In some embodiments, the press cover anti-pinch device further includes an unlocking trigger 5. The unlocking trigger 5 is arranged in a contact position and is configured to unlock the locking mechanism from the locking position to the unlocking position when the reset member 41 comes into contact with the unlocking trigger 5. When it is required to switch the support 3 from the locked state to the rotatable state, it is only necessary to make the reset member 41 come into contact with the unlocking trigger 5, so that the reset member 41 unlocks the locking mechanism from the locking position to the unlocking position by means of a reset action, and at this time, the support 3 is switched from the locked state to the rotatable state. Providing the unlocking trigger 5 enables switching between the locking position and the unlocking position of the locking mechanism to be more convenient and faster, and thus switching from the locked state to the rotatable state of the support 3 to be more convenient and faster.

The unlocking trigger 5 may be a trigger rod, a trigger block, etc., the unlocking trigger 5 may be arranged transversely or longitudinally, and the unlocking trigger 5 only needs to be capable of coming into contact with the reset member 41 and to be capable of unlocking the locking mechanism from the locking position to the unlocking position after the two comes into contact with each other. Any structure capable of meeting the functional requirement falls within the scope of protection of the embodiment. As shown in FIGS. 1-12, the unlocking trigger 5 is arranged longitudinally on a base 7.

In some embodiments, the contact position is a position where the reset member 41 comes into contact with the unlocking trigger when the press cover is lowered. In this way, when the press cover is lowered, the reset member 41 comes into contact with the unlocking trigger 5 in the contact position, so that the locking mechanism is unlocked from the locking position to the unlocking position under the action of the reset member 41, and at this time, the support 3 is switched from the locked state to the rotatable state, thereby ensuring that when the press cover is risen, the support 3 can swing down and support the press cover on the supporting surface 11 during the next operation. Setting the contact position as the position where the reset member 41 comes into contact with the unlocking trigger when the press cover is lowered can ensure that the support 3 is automatically switched to the rotatable state when the press cover is lowered, so that the operation is more convenient during next use.

In some embodiments, the locking mechanism 4 includes the first locking structure 42 and the second locking structure 32, wherein the first locking structure 42 is arranged on or connected to the connector 2 and has a first engagement portion, the second locking structure 32 is arranged on or connected to the support 3 and has a second engagement portion adapted to the first engagement portion, and when the support 3 is arranged in the supporting position and/or the collapsed position, the first engagement portion is engaged with the second engagement portion. The engagement between the first locking structure 42 and the second locking structure 32 to lock the support 3 in the supporting position and/or the collapsed position can prevent the support 3 from moving in the supporting position and/or the collapsed position, improving the safety of the operation. When the first engagement portion and the second engagement portion are separated from each other, namely, when the locking mechanism is in the unlocking position, the support 3 is in the rotatable state again, and state switching is convenient and free.

In short, as part of the locking mechanism 4, the first locking structure 42 may be arranged directly on the locking mechanism 4 and integrally formed with other components of the locking mechanism 4; or the first locking structure may be first arranged on a further component and is then connected to the connector 2 or the support 3 by means of the further component. For example, the first locking structure 42 is first arranged on a connecting rod and is then connected to the connector 2 or the support 3 by means of the connecting rod.

The engagement connection manner of the first engagement portion and the second engagement portion includes: various concave-convex fit structures such as a key and key groove fit connection, a protrusion and recess fit connection, and a two-boss fit structure (such as the fitting of a protrusion or a snap key, etc.). Any structure capable of achieving the engagement between the first engagement portion and the second engagement portion fall within the scope of protection of the embodiment.

In some embodiments, the connector 2 or the support 3 has a curved surface portion 31 with a hinged shaft as a central axis at the end where the connector 2 is hinged to the support 3, and the first engagement portion or the second engagement portion is arranged on the curved surface portion 31. In this way, when the support 3 is rotated to the supporting position and/or the collapsed position, the first engagement portion and the second engagement portion are automatically engaged closely, so that locking of the support 3 is more convenient and faster.

The curved surface portion 31 may be in a shape of a variety of curved surfaces, such as a circular cylindrical surface, an elliptic cylindrical surface, or a parabolic surface. Preferably, the curved surface portion 31 may be in the shape of the circular cylindrical surface. In this way, during rotation, the support 3 can drive the curved surface portion 31 with the hinged shaft as the central axis, and thus the second engagement portion arranged on the curved surface portion 31, to move. When the support 3 is rotated to the supporting position and/or the collapsed position, the first engagement portion and the second engagement portion are automatically engaged closely, so that locking of the support 3 is more convenient and faster.

In some embodiments, the locking mechanism 4 further includes: the reset member 41. The reset member 41 is hinged to the connector 2 or the support 3 and is configured to automatically reset the locking mechanism 4 from the unlocking position to the locking position when the support 3 is arranged in the supporting position and/or the collapsed position, and the reset member 41 has the first locking structure 42 or the second locking structure 32. The first locking structure 42 or the second locking structure 32 is arranged on the reset member 41, such that when the support 3 is in the supporting position and/or the collapsed position, the support 3 is locked by means of the engagement between the locking structure on the reset member 41 and the locking structure on the support 3; and when the locking structure on the reset member 41 is separated from the locking structure on the support 3, the support 3 is in the rotatable state again, so that the two states of the support 3 are free to switch, and the operation is more convenient and faster.

In some embodiments, one end of the reset member 41 is hinged to the connector 2, the other end thereof is a movable end 411, the first locking structure 42 is arranged on the reset member 41, and the first engagement portion is arranged between the hinged end and the movable end 411 of the connector 2; and the unlocking position of the unlocking trigger 5 is arranged in a path along which the movable end 411 of the reset member 41 is lowered with the press cover. Since the unlocking position of the unlocking trigger 5 is arranged in the path along which the movable end 411 of the reset member 41 is lowered with the press cover, when the press cover is lowered, the movable end 411 is driven to lower therewith, and when the movable end 411 is lowered to the unlocking position of the unlocking trigger 5, the unlocking trigger 5 applies an upward reaction force to the movable end 411 of the reset member 41, so that the first engagement portion and the second engagement portion are separated from each other to ensure that the support 3 is in the rotatable state when being collapsed for next use.

Preferably, the reset member 41 is arranged transversely. The reset member 41 is arranged transversely, so that it can be ensured that the movable end 411 of the reset member can easily come into contact with the unlocking trigger 5 during the lowering of the reset member 41 with the press cover.

In some embodiments, when the connector 2 is risen with the cover body 1, the support 3 swings down to the supporting position by means of its own gravity. Since the connector 2 is arranged at the lower side of the cover body 1 of the press cover and the support 3 is in turn hinged to the connector 2, during rising, the cover body 1 of the press cover drives the connector 2 to rise, and due to the action of gravity, the support 3 swings down to the supporting position, so as to support the cover body 1 of the press cover. With such an arrangement, it can be ensured that when the cover body 1 is risen to a certain height, the support 3 automatically swings down to the supporting position for providing a support function to the cover body 1, further improving the safety of production operation.

In some embodiments, a handle structure 6 for the operator to apply a force is arranged on the support 3. After use, the operator can apply an acting force to the support 3 in a rotation direction by means of the handle structure 6, so that the support 3 is removed from the supporting position, the press cover is then lowered, and the support 3 is collapsed for next use.

Reference is mad to FIGS. 1-4, which are schematic operation diagrams of a press cover anti-pinch device according to an embodiment of the present application. In the embodiment, the reset member 41 is a gravitational reset member. The first engagement portion is a protrusion, and the second engagement portion is a recess. The first engagement portion is arranged on the reset member 41, and the second engagement portion is arranged on the support 3 and is located on the curved surface portion 31 with the hinged shaft as the central axis at the end of the support hinged to the connector 2. The operating principle of the press cover anti-pinch device in FIGS. 1-4 will be described below.

Reference is made to FIG. 1, which is a schematic structural diagram of a press cover anti-pinch device of a press cover during rising according to an embodiment of the present application. After the press cover is opened, the press cover is driven by a driving mechanism thereof to slowly rise, so that the connector 2 arranged on the lower surface of the cover body 1 of the press cover is risen as the cover body 1 is risen, and the support 3 swings down to the supporting position due to its own gravity. For example, in FIG. 1, when the cover body 1 of the press cover is risen upward, the support 3 swings in a counterclockwise direction under the action of its own gravity.

Figure 2:
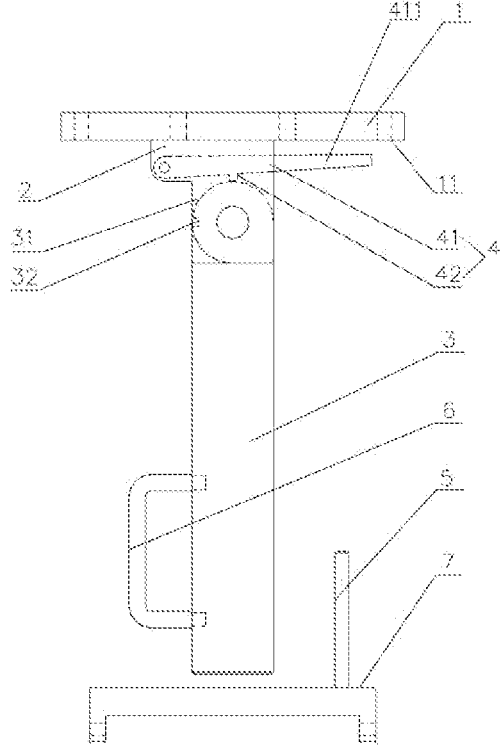
FIG. 2 is a schematic structural diagram of a support of the press cover anti-pinch device in a supporting position according to an embodiment of the present application.

Reference is made to FIG. 2, which is a schematic structural diagram of the support 3 of the press cover anti-pinch device in the supporting position according to an embodiment of the present application. When the support 3 swings down to the lowest supporting position, which is perpendicular to the lower surface of the press cover body 1, the operator can perform an operation, for example, a feeding or taking operation performed within the area range of the cover body 1. During the operation, due to the support of the support 3, the cover body 1 does not fall down even if the cover body is faulty at this time, and the safety of the operator during the operation is effectively ensured.

Figure 3:
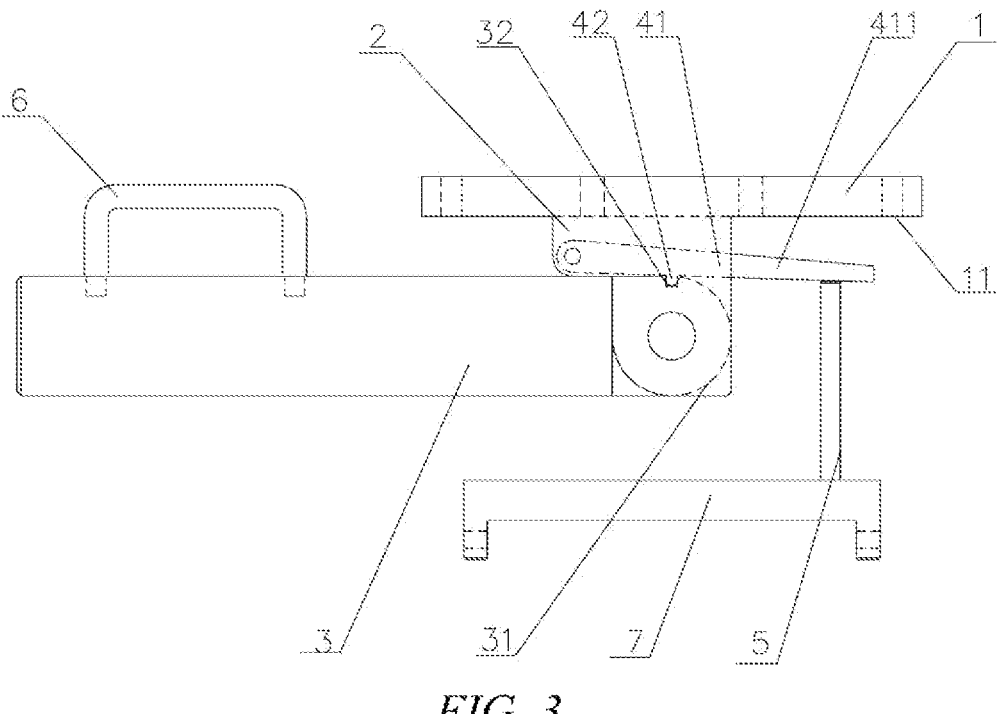
FIG. 3 is a schematic structural diagram of the press cover anti-pinch device, when a movable end of a reset member comes into contact with an unlocking trigger, according to an embodiment of the present application.

Reference is made to FIG. 3, which is a schematic structural diagram of the press cover anti-pinch device, when the movable end 411 of the reset member 41 comes into contact with the unlocking trigger 5, according to an embodiment of the present application. After the operation is finished, the operator can apply an acting force to the support 3 from the supporting position to the collapsed position by means of a handle on the support 3, so that the support 3 is rotated from the supporting position to the collapsed position. When the support 3 is in the collapsed position, the reset member 41 moves downwards due to the action of gravity, so that the first engagement portion on the first locking structure 42 is just engaged with the second engagement portion on the second locking structure 32, and at this time, the locking mechanism is in the locking position and no relative sliding occurs between the support 3 and the connector 2, ensuring the safety during the falling of the press cover. For example, in FIG. 3, when the support 3 is in the collapsed position, the support 3 is arranged transversely. The press cover is then controlled to lower, so that when the press cover is lowered to the position shown in FIG. 3, the movable end 411 of the reset member 41 just comes into contact with the unlocking trigger 5 arranged below the movable end 411.

Figure 4:
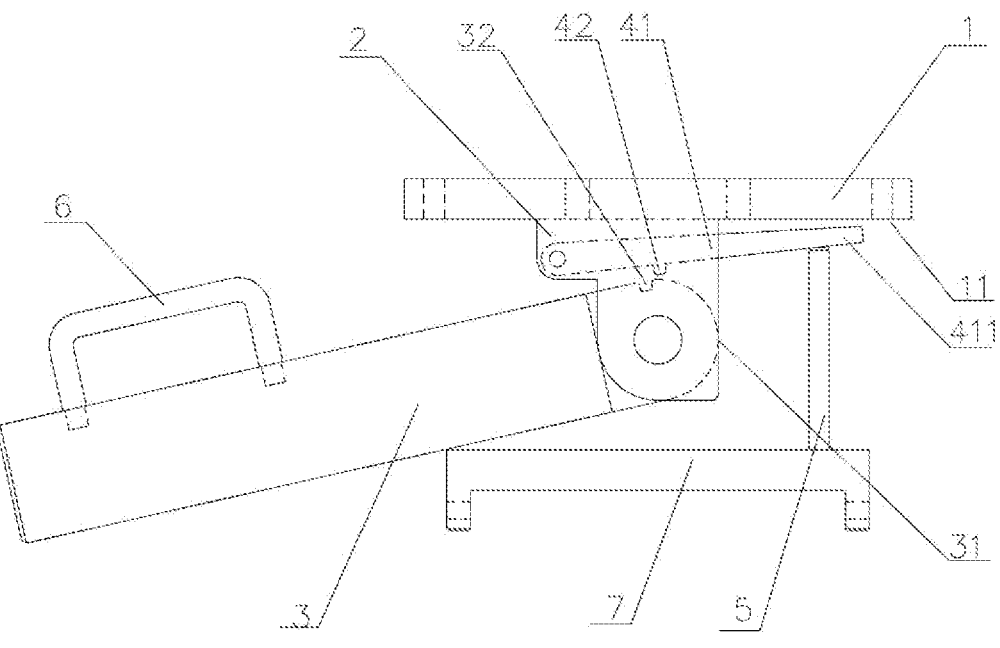
FIG. 4 is a schematic structural diagram of the press cover anti-pinch device, when the movable end of the reset member come into contact with the unlocking trigger, according to an embodiment of the present application.

Reference is made to FIG. 4, which is a schematic structural diagram of the press cover anti-pinch device, after the movable end 411 of the reset member 41 comes into contact with the unlocking trigger 5, according to an embodiment of the present application. When the movable end 411 of the reset member 41 is lowered to the unlocking position of the unlocking trigger 5, the unlocking trigger 5 applies an upward reaction force to the movable end 411 of the reset member 41, so that the first engagement portion on the first locking structure 42 is separated from the second engagement portion on the second locking structure 32 to ensure that the support 3 is in the rotatable state when being collapsed for next use.

Reference is made to FIGS. 5-8, which are schematic operation diagrams of a press cover anti-pinch device according to another embodiment of the present application.

The difference from the embodiment in FIGS. 1-4 lies in that, the press cover anti-pinch device is provided with a spring 412 between the movable end 411 of the reset member 41 and the lower surface of the press cover body 1, wherein the spring 412 is in a compressed state when the support 3 is in the supporting position. In the embodiment, the reset member 41 is a combination of a gravitational reset member and an elastic reset member. The first engagement portion is a protrusion, and the second engagement portion is a recess. The first engagement portion is arranged on the reset member 41, and the second engagement portion is arranged on the support 3 and is located on the curved surface portion 31 with the hinged shaft as the central axis at the end of the support hinged to the connector 2. The operating principle of the press cover anti-pinch device in FIGS. 5-8 will be described below.

Figure 5:
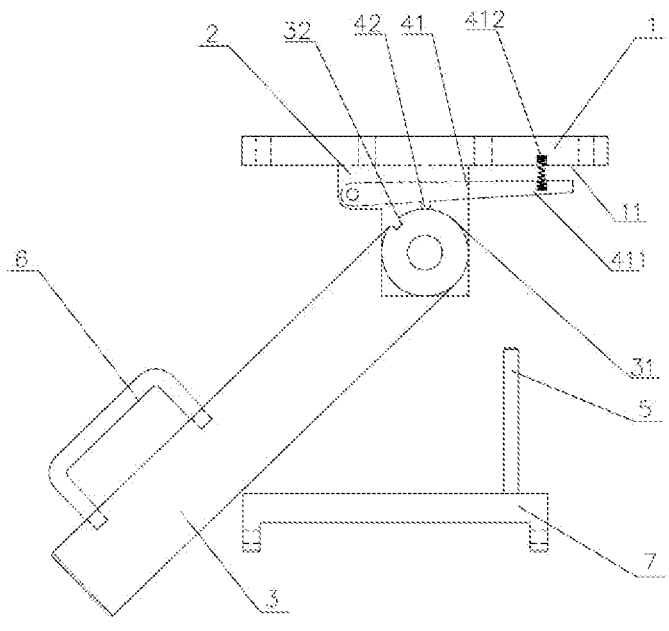
FIG. 5 is a schematic structural diagram of a press cover anti-pinch device of a press cover during rising according to another embodiment of the present application.

Reference is made to FIG. 5, which is a schematic structural diagram of a press cover anti-pinch device of a press cover during rising according to an embodiment of the present application. After the press cover is opened, the press cover is driven by a driving mechanism thereof to slowly rise, so that the connector 2 arranged on the lower surface of the cover body 1 of the press cover is risen as the cover body 1 is risen, and the support 3 swings down to the supporting position due to its own gravity. For example, in FIG. 5, when the cover body 1 of the press cover is risen upward, the support 3 swings in the counterclockwise direction under the action of its own gravity. Since the curved surface portion 31 with the hinged shaft as the central axis at the end of the support 3 hinged to the connector 2 applies an upward acting force to the protrusion of the first locking structure 42, so that the movable end 411 of the reset member 41 is moved upward to compress the spring 412, and at this time, the spring 412 arranged between the movable end 411 of the reset member 41 and the lower surface of the press cover body 1 is thus in the compressed state.

Figure 6:
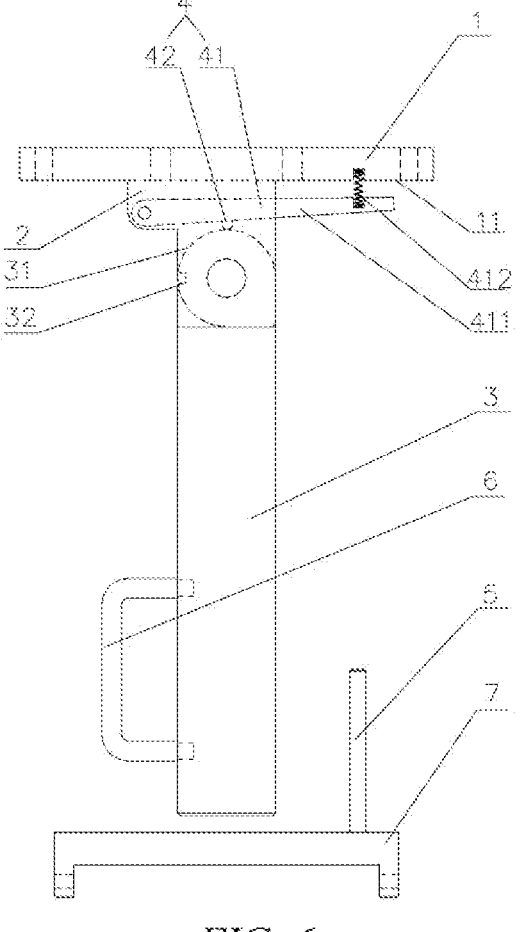
FIG. 6 is a schematic structural diagram of a support of the press cover anti-pinch device in a supporting position according to another embodiment of the present application.

Referring to FIG. 6, when the support 3 swings down to the lowest supporting position, which is perpendicular to the lower surface of the press cover body 1, the movable end 411 of the reset member 41 always applies a compression force to the spring 412. The operator can perform an operation within the area range of the press cover, for example, a feeding or taking operation performed within the area range of the cover body 1. During the operation, due to the support of the support 3, the cover body 1 does not fall down even if the cover body is faulty at this time, and the safety of the operator during the operation is effectively ensured.

Figure 7:
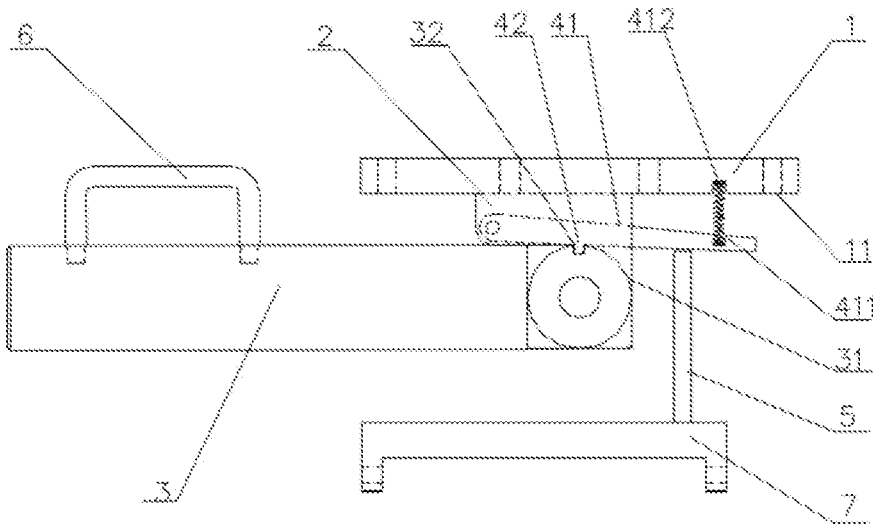
FIG. 7 is a schematic structural diagram of the press cover anti-pinch device, when a movable end of a reset member comes into contact with an unlocking trigger, according to another embodiment of the present application.

Referring to FIG. 7, after the operation is finished, the operator can apply an acting force to the support 3 from the supporting position to the collapsed position by means of a handle on the support 3, so that the support 3 is rotated from the supporting position to the collapsed position. When the first engagement portion on the first locking structure 42 is positioned corresponding to the second engagement portion on the second locking structure 32, due to the action of a restoring force of the spring 412, a downward elastic force is applied to the movable end 411 of the reset member 41, so that the first engagement portion is engaged with the second engagement portion, and at this time, the locking mechanism is in the locking position and the support 3 is in the collapsed position. No relative sliding occurs between the support 3 and the connector 2 due to the engagement between the first engagement portion and the second engagement portion, and the safety is ensured during the falling of the press cover. The press cover is then controlled to lower, so that when the press cover is lowered to the position shown in FIG. 7, the movable end 411 of the reset member 41 just comes into contact with the unlocking trigger 5 arranged below the movable end 411.

Figure 8:
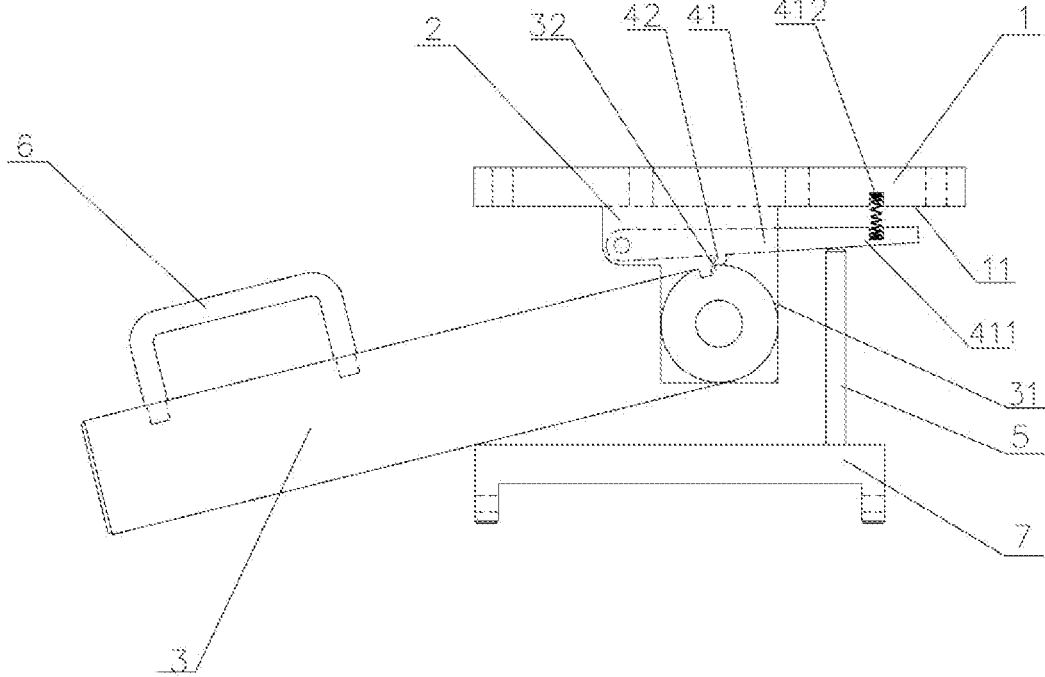
FIG. 8 is a schematic structural diagram of the press cover anti-pinch device, when the movable end of the reset member comes into contact with the unlocking trigger, according to another embodiment of the present application.

Referring to FIG. 8, when the movable end 411 of the reset member 41 is lowered to the unlocking position of the unlocking trigger 5, the unlocking trigger 5 applies an upward reaction force to the movable end 411 of the reset member 41, so that the first engagement portion on the first locking structure 42 is separated from the second engagement portion on the second locking structure 32 to ensure that the support 3 is in the rotatable state when being collapsed for next use.

Reference is made to FIGS. 9-12, which are schematic operation diagrams of a press cover anti-pinch device according to a further embodiment of the present application. The differences from the embodiments in FIGS. 1-8 lie in that, the reset member 41 is an elastic reset member, and the elastic reset member includes a vertical rod, a snap block and a spring 412, wherein the vertical rod is longitudinally arranged and is connected to the lower surface of the press cover body 1, the spring 412 is arranged between the snap block and the vertical rod, and the first engagement portion is arranged on the snap block. The side wall of the connector 2 adjacent to the snap block is provided with a notch enabling the first engagement portion to enter. When the first engagement portion is positioned opposite the second engagement portion, the first engagement portion enters the notch and is engaged with the second engagement portion; and when the first engagement portion is not positioned opposite the second engagement portion, the first engagement portion abuts against the curved surface portion 31 with the hinged shaft as the central axis at the end of the support 3 hinged to the connector 2, and at this time, the spring 412 between the snap block and the vertical rod is in the compressed state. The first engagement portion is a protrusion, and the second engagement portion is a recess. The operating principle of the press cover anti-pinch device in FIGS. 9-12 will be described below.

Figure 9:
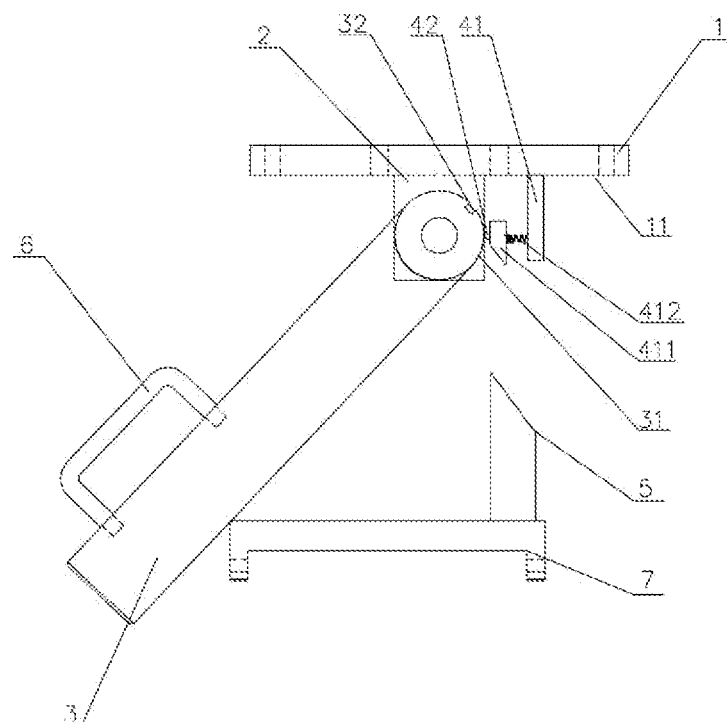
FIG. 9 is a schematic structural diagram of a press cover anti-pinch device of a press cover during rising according to a further embodiment of the present application.

Referring to FIG. 9, after the press cover is opened, the press cover is driven by a driving mechanism thereof to slowly rise, so that the connector 2 arranged on the lower surface of the cover body 1 of the press cover is risen as the cover body 1 is risen, and the support 3 swings down to the supporting position due to its own gravity. For example, in FIG. 9, when the cover body 1 of the press cover is risen upward, the support 3 swings in the counterclockwise direction under the action of its own gravity. Since, during the rotation of the support 3 from an initial position to the supporting position, the position on the curved surface portion 31 in contact with a protrusion on the snap block is always not the position of the recess, the spring 412 on the reset member 41 and arranged between the vertical rod and the snap block is always in the compressed state.

Figure 10:
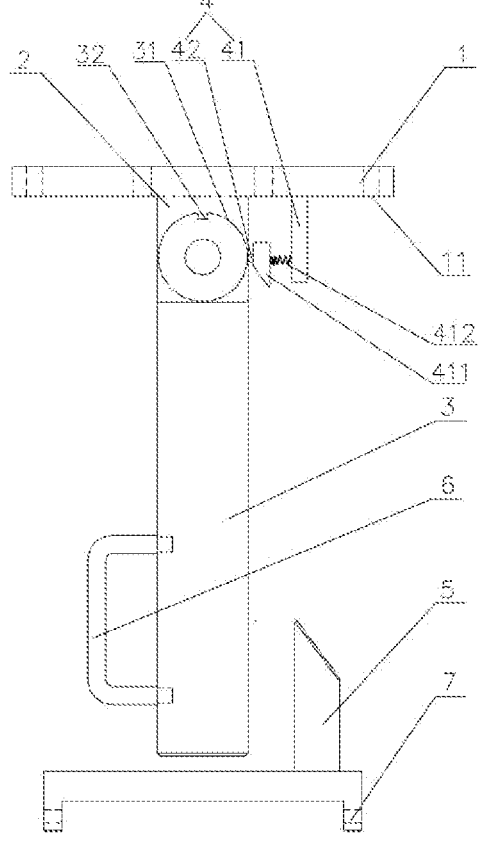
FIG. 10 is a schematic structural diagram of a support of the press cover anti-pinch device in a supporting position according to a further embodiment of the present application.

Referring to FIG. 10, when the support 3 swings down to the lowest supporting position, which is perpendicular to the lower surface of the press cover body 1, the movable end 411 of the reset member 41 still applies a compression force to the spring 412. The operator can perform an operation within the area range of the press cover, for example, a feeding or taking operation performed within the area range of the cover body 1. During the operation, due to the support of the support 3, the cover body 1 does not fall down even if the cover body is faulty at this time, and the safety of the operator during the operation is effectively ensured.

Figure 11:
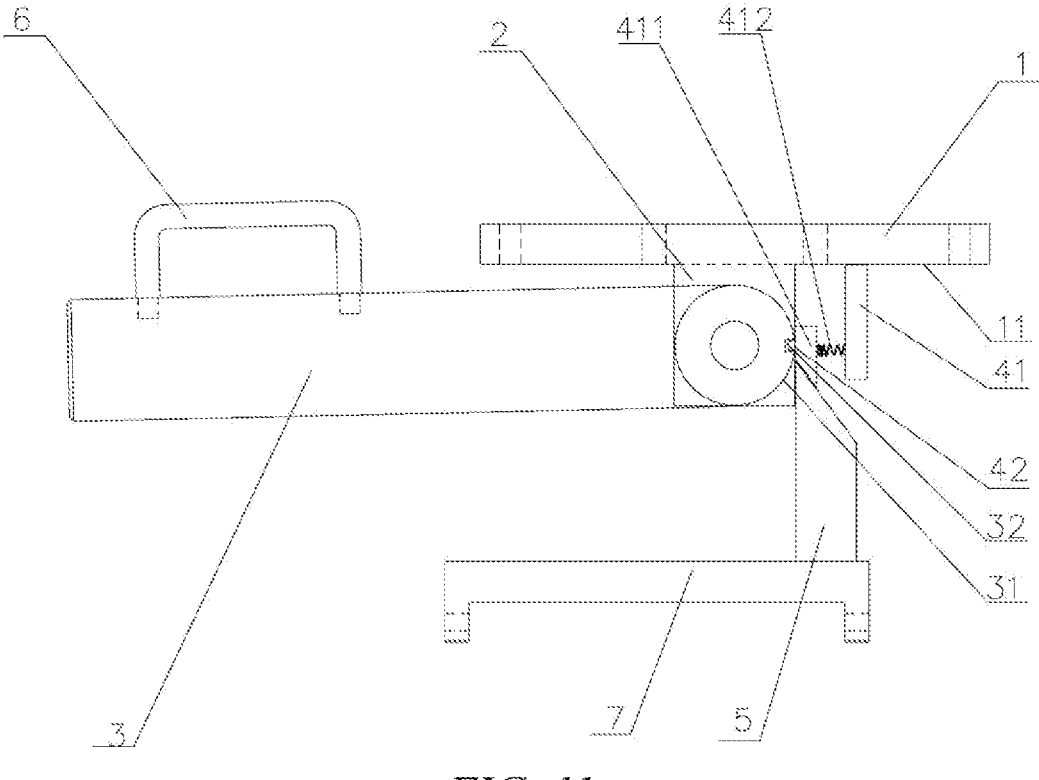
FIG. 11 is a schematic structural diagram of the press cover anti-pinch device, when a movable end of a reset member comes into contact with an unlocking trigger, according to a further embodiment of the present application.

Referring to FIG. 11, after the operation is finished, the operator can apply an acting force to the support 3 from the supporting position to the collapsed position by means of a handle on the support 3, so that the support 3 is rotated from the supporting position to the collapsed position. When the support 3 is rotated to the collapsed position, the recess of the curved surface portion 31 is just aligned with the protrusion of the snap block, and at this time, due to the action of the restoring force of the spring, a leftward elastic force is applied to the snap block, so that the protrusion on the snap block extends into the recess of the curved surface portion 31 by means of the notch in the connector 2. At this time, the locking mechanism is in the locking position, and the support 3 is in a locked state. Due to the engagement between the recess and the protrusion, the support 3 cannot relatively slide when the press cover falls down, and the safety is ensured during the falling of the press cover. The press cover can then be controlled to lower, so that when the press cover is lowered to the position shown in FIG. 11, a lower end face of the snap block of the reset member 41 just comes into contact with an upper end face of the unlocking trigger 5. Preferably, the lower end face of the snap block and the upper end face of the unlocking trigger 5 are configured as inclined surfaces shaped to adapt to each other.

Figure 12:
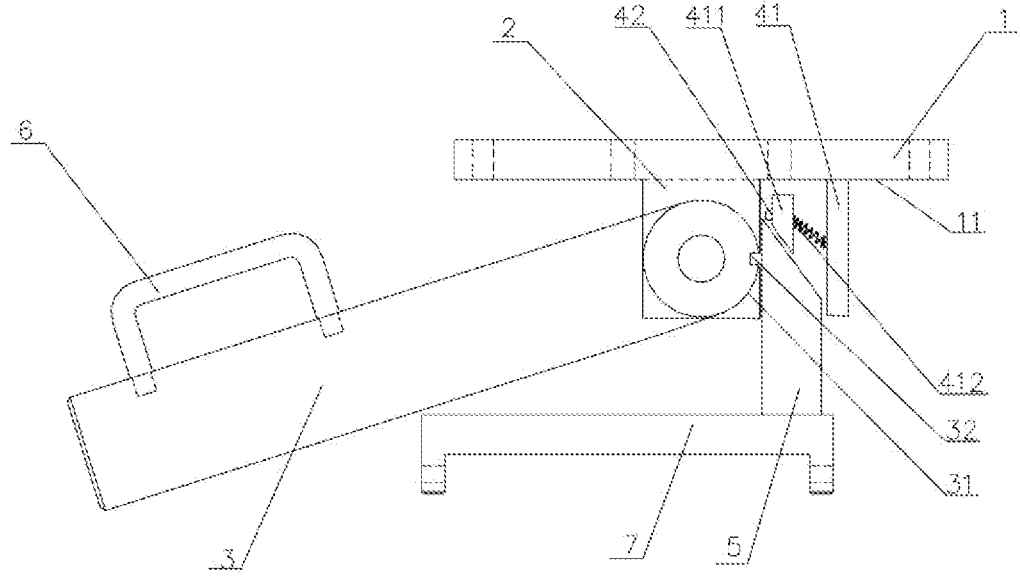
FIG. 12 is a schematic structural diagram of the press cover anti-pinch device, when the movable end of the reset

Referring to FIG. 12, after the lower end face of the snap block of the reset member 41 comes into contact with the upper end face of the unlocking trigger 5, the snap block serves as a sliding end of the reset member 41, the unlocking trigger 5 applies an upward reaction force to the snap block, so that the recess on the curved surface portion 31 of the support 3 is separated from the protrusion on the snap block, namely, the locking mechanism is switched from the locking position to the unlocking position again, so as to ensure that the support 3 is in the rotatable state when being collapsed for next use.

In a second aspect, the inventors further provide an apparatus having a press cover, the press cover being openable or closable, and a press cover anti-pinch device as described in the first aspect being arranged at a lower side of the press cover.

Compared with the prior art, the apparatus having the press cover in the present application includes the press cover and the press cover anti-pinch device, the support 3 in the press cover anti-pinch device can be in the supporting position after the press cover is risen to support the cover body 1 of the press cover, preventing the cover body 1 from suddenly falling down to hurt an operator due to a fault, and effectively ensuring the safety of the operator during operation.

In some embodiments, the apparatus is a tank-type apparatus. The tank-type apparatus is often used in daily production and processing. Arranging the press cover anti-pinch device in the tank-type apparatus can cover more operation scenarios as much as possible to ensure the safety of an operator during operation. The tank-type apparatus may be a storage tank, a reaction tank, a stirring tank, etc. and any tank-type apparatus having a press cover falls within the scope of protection of the embodiment.

Finally, it should be noted that the above embodiments are merely used for illustrating rather than limiting the technical solution of the present application. Although the present application has been illustrated in detail with reference to the foregoing embodiments, it should be understood by those of ordinary skill in the art that the technical solutions recorded in the foregoing embodiments may still be modified, or some or all of the technical features thereof may be equivalently substituted; and such modifications or substitutions do not make the essence of the corresponding technical solution depart from the scope of the technical solutions of the embodiments of the present application, and should fall within the scope of the claims and the description of the present application. In particular, the technical features mentioned in the embodiments can be combined in any manner, provided that there is no structural conflict. The present application is not limited to the specific embodiments disclosed herein but includes all the technical solutions that fall within the scope of the claims.

The invention claimed is:

1. A press cover anti-pinch device, comprising:
a connector arranged at a lower side of a cover body of a press cover and fixed to the press cover; and
a support hinged to the connector and rotatably arranged in a supporting position or in a collapsed position, wherein when the support is arranged in the supporting position, the support swings down and supports the press cover on a supporting surface, and when the support is arranged in the collapsed position, the support is collapsed and the press cover is lowered.

2. The press cover anti-pinch device according to claim 1, further comprising:
a locking mechanism arrangeable in a locking position or in an unlocking position, wherein when the locking mechanism is arranged in the locking position, the support is locked in the supporting position and/or the collapsed position, and when the locking mechanism is arranged in the unlocking position, the support is rotatable to another position other than the locking position.

3. The press cover anti-pinch device according to claim 2, wherein the locking mechanism comprises:
a reset member configured to automatically reset the locking mechanism from the unlocking position to the locking position when the support is arranged in the supporting position and/or the collapsed position.

4. The press cover anti-pinch device according to claim 3, wherein the reset member is a gravitational reset member or an elastic reset member.

5. The press cover anti-pinch device according to claim 4, wherein the reset member is hinged to the connector or the support, and swings down by means of its own gravity to automatically reset the locking mechanism to the locking position.

6. The press cover anti-pinch device according to claim 5, further comprising:
an unlocking trigger arranged in a contact position and configured to unlock the locking mechanism from the locking position to the unlocking position when the reset member comes into contact with the unlocking trigger.

7. The press cover anti-pinch device according to claim 4, further comprising:
an unlocking trigger arranged in a contact position and configured to unlock the locking mechanism from the locking position to the unlocking position when the reset member comes into contact with the unlocking trigger.

8. The press cover anti-pinch device according to claim 3, further comprising:
an unlocking trigger arranged in a contact position and configured to unlock the locking mechanism from the locking position to the unlocking position when the reset member comes into contact with the unlocking trigger.

9. The press cover anti-pinch device according to claim 8, wherein the contact position is a position where the reset member comes into contact with the unlocking trigger when the press cover is lowered.

10. The press cover anti-pinch device according to claim 2, wherein the locking mechanism comprises:

a first locking structure arranged on or connected to the connector and having a first engagement portion; and a second locking structure arranged on or connected to the support and having a second engagement portion adapted to the first engagement portion, wherein when the support is arranged in the supporting position and/or the collapsed position, the first engagement portion is engaged with the second engagement portion.

11. The press cover anti-pinch device according to claim 10, wherein the connector or the support has a curved surface portion with a hinged shaft as a central axis at the end where the connector is hinged to the support, and the first engagement portion or the second engagement portion is arranged on the curved surface portion.

12. The press cover anti-pinch device according to claim 11, wherein the locking mechanism further comprises:

a reset member hinged to the connector or the support and configured to automatically reset the locking mechanism from the unlocking position to the locking position when the support is arranged in the supporting position and/or the collapsed position, the reset member having the first locking structure or the second locking structure.

13. The press cover anti-pinch device according to claim 10, wherein the locking mechanism further comprises:

a reset member hinged to the connector or the support and configured to automatically reset the locking mechanism from the unlocking position to the locking position when the support is arranged in the supporting position and/or the collapsed position, the reset member having the first locking structure or the second locking structure.

14. The press cover anti-pinch device according to claim 13, wherein one end of the reset member is hinged to the connector, the other end thereof is a movable end, the first locking structure is arranged on the reset member, and the first engagement portion is arranged between the hinged end and the movable end of the connector; and the unlocking position of the unlocking trigger is arranged in a path along which the movable end of the reset member is lowered with the press cover.

15. The press cover anti-pinch device according to claim 14, wherein the reset member is arranged transversely.

16. The press cover anti-pinch device according to claim 1, wherein when the connector is risen with the cover body, the support swings down to the supporting position by means of its own gravity.

17. The press cover anti-pinch device according to claim 1, wherein a handle structure for an operator to apply a force is arranged on the support.

18. An apparatus having a press cover, wherein the press cover is openable or closable, and a press cover anti-pinch device according to claim 1 is arranged at a lower side of the press cover.

19. The apparatus according to claim 18, wherein the apparatus is a tank-type apparatus.

* * * * *